United States Patent [19]

Baltensperger

[11] Patent Number: 4,860,843
[45] Date of Patent: Aug. 29, 1989

[54] PULLING OR LOADING VEHICLE WITH FREE SPACE BETWEEN THE REAR WHEELS

[75] Inventor: Eduard Baltensperger, Brütten, Switzerland

[73] Assignees: Eduard Baltensperger, Brütten; Kurt Eicher, Regensdorf, both of Switzerland

[21] Appl. No.: 210,573

[22] Filed: Jun. 21, 1988

[30] Foreign Application Priority Data

Jul. 1, 1987 [CH] Switzerland .................. 2497/87

[51] Int. Cl.⁴ ............................................. B60K 17/00
[52] U.S. Cl. ..................................... 180/373; 180/900
[58] Field of Search .................. 180/900, 15, 70.1, 72, 180/75

[56] References Cited

U.S. PATENT DOCUMENTS

| 1,327,376 | 1/1920 | Delieuvin | 180/15 |
| 2,228,454 | 1/1941 | Hamilton | 180/900 |
| 4,585,084 | 4/1986 | Van Der Lely | 180/900 |

FOREIGN PATENT DOCUMENTS

| 1069416 | 11/1959 | Fed. Rep. of Germany | 180/900 |
| 2577191 | 8/1986 | France | 180/900 |

Primary Examiner—Kenneth R. Rice
Attorney, Agent, or Firm—Walter C. Farley

[57] ABSTRACT

A pulling or loading vehicle, particularly a tractor, with rear wheel or all-wheel drive has rear wheels mounted on wheel mounting (10) which are spaced from the vehicle tail. The rear wheel mounting (10) is substantially U-shaped and contains a drive means (15). There is a free space (1) between the rear wheels for coupling auxiliary means and units (17, 20, 22, 24, 27, 31, 33).

13 Claims, 8 Drawing Sheets

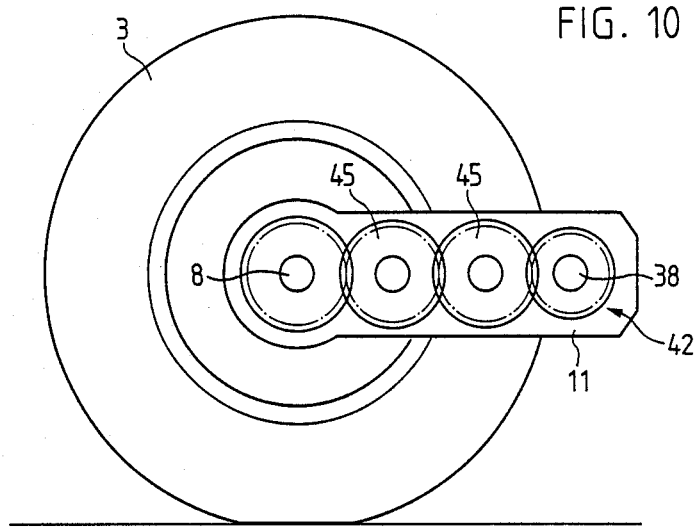

PULLING OR LOADING VEHICLE WITH FREE SPACE BETWEEN THE REAR WHEELS

The present invention relates to an improved pulling or loading vehicle having either rear-wheel or all-wheel drive.

BACKGROUND OF THE INVENTION

Pulling or hauling vehicles have been used for decades, particularly in the form of tractors for agricultural or forestry purposes. Although the requirements made on such vehicles and the uses thereof have undergone considerable changes, the basic construction thereof has essentially remained unchanged.

Although originally a relatively high tractor weight was desired, because they were used purely as pulling vehicles and consequently the rear axle had to be adequately loaded, of late and in particular following the development of tools or implements to be directly suspended on the tractor, the weight of the tractor and the weight distribution have proved disadvantageous. By means of three-point suspension or hydraulic lifting devices, numerous means are now coupled to the rear of the tractor and during operation can be lowered onto the ground or raised when moving. These implements or tools in part have considerable weight and therefore lead to additional loading of the rear tractor axle.

If very heavy tools are hung on the rear of the tractor, there is a risk that this will cause leverage and consequently an unfavorable weight distribution which can bring about lifting of the front axle. The presently conventional countermeasure comprises fitting additional weights in the vicinity of the tractor front axle, so that the front axle load is raised. Although this is able to stabilize the tractor and prevent lifting of the front axle, it simultaneously considerably increases the total tractor weight and consequently causes very considerable ground or soil pressure. Due to the great overall weight, it is frequently necessary to have a four or all-wheel drive in order to increase the tractive power, but this only insignificantly improves the pulling capacity, because in accordance with the short construction of such tractors the vehicle weight is displaced to the rear axle due to the pulling moment and the weight distribution in operation.

As a result of the weight of the tractor and tools and the consequent considerable loading in particular of the rear axle, the soil is greatly compressed and damaged along the wheel track. This is prejudicial to the activity of soil organisms and bacteria and the field is compressed so that there is an inadequate oxygen supply and disturbed water conservation of the soil. Due to the destroyed soil capillarity, the water drainage under rainy conditions and the rising of the water during good weather are impaired. This excessive soil loading also leads to the destruction of plant growth, the obtaining of a lower yield and necessitates increased fertilizer and pesticide application. This leads to additional harming of the environment, all of which could be avoided by the use of suitable tractors and tools. Moreover, the travelling characteristics of vehicles designed in this way are very unfavorable and dangerous. This more particularly applies as a result of inadequate loading of the front axle and consequently to difficult controllability of the vehicle, particularly when travelling rapidly on roads.

SUMMARY OF THE INVENTION

An object of the present invention is to provide a pulling or loading vehicle which has more favorable travelling characteristics through suitable weight distribution and loading of the rear wheels, has limited overall weight of vehicle and tools, and causes limited soil loading accompanied by high maneuverability and small dimensions.

BRIEF DESCRIPTION OF THE DRAWINGS

Embodiments of the invention are described hereinafter relative to the drawings, wherein:

FIG. 10 is a partial side elevation, partly cut away of a rear wheel drive with gears.

Although hereinafter reference is essentially only made to a tractor, the inventive vehicle construction can be used for all types of pulling and loading vehicles.

As will be described in detail, a pulling vehicle in accordance with the invention has a rear wheel fixture or mounting with two legs or longitudinal struts. This rear wheel mounting preferably comprises a transverse strut portion and two longitudinal struts forming a U with the transverse strut and carrying the wheels. The strut structure is preferably located in a substantially horizontal plane and is oriented in such a way that the transverse strut construction is fixed to the rear end of the vehicle chassis or frame and the two longitudinal struts project rearwardly and parallel to the direction of travel. The two rear wheels are fitted to or near the free ends of these two longitudinal struts so that there is a free space or gap between the wheels. This makes it possible to couple or hang a tool and/or other implement to the vehicle in such a way that the center of gravity thereof is in front of or only just behind the rear wheel axle line. This relieves weight from the rear wheels and brings about optimum weight distribution. This simultaneously offers completely new possibilities for the use of tools or additional drive means. The advantages brought about by the invention more particularly become apparent in the case of a short wheelbase construction of the pulling vehicle because then the risk of lifting the front axle is particularly acute. This improved axle load distribution also increases safety through improved high speed behavior of the tractor, particularly on roads.

Figure 1:
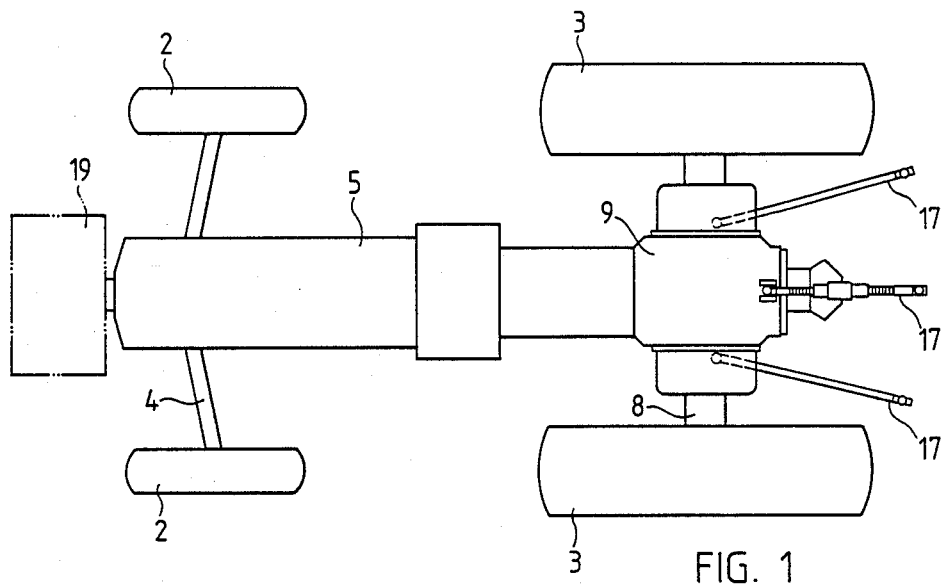
FIG. 1 is a top plan view of a conventional tractor.

FIG. 1 is a simplified schematic view from above of a conventional tractor. It is possible to see the frame or chassis with the engine assembly 5, the solid rear axle 8 and the rear wheel drive block 9. The construction of such a tractor leads to an uneven weight distribution on the axles with approximately a third of the weight on the front axle and two thirds of the weight on the rear axle 8. As can be gathered from FIG. 1, if, e.g., a three-point suspension with three hinged brackets 17 is attached so that the brackets can be moved vertically by a hydraulic lifting device (not shown), the suspension must necessarily be positioned behind the rear wheel drive block 9. However, this leads to an additional weight displacement, because a tool fixed to the hinged brackets 17 exerts leverage with respect to the rear axle, front wheels 2 are relieved of more load and, consequently, additional weight is applied to the rear wheels 3. Thus, the bearing points of the rear wheels 3 exert considerable pressure on the soil and soil structure, i.e., both the capillarity of the soil and small and very small organisms are destroyed. Additional weights 19 in the front of the tractor, which are often provided for increasing the stability or improving the steerability of the tractor, do not prevent the loading of the rear wheels 3 and fail to relieve the latter. In fact, the overall weight of the tractor is increased, so that additional soil loading occurs.

Figure 2:
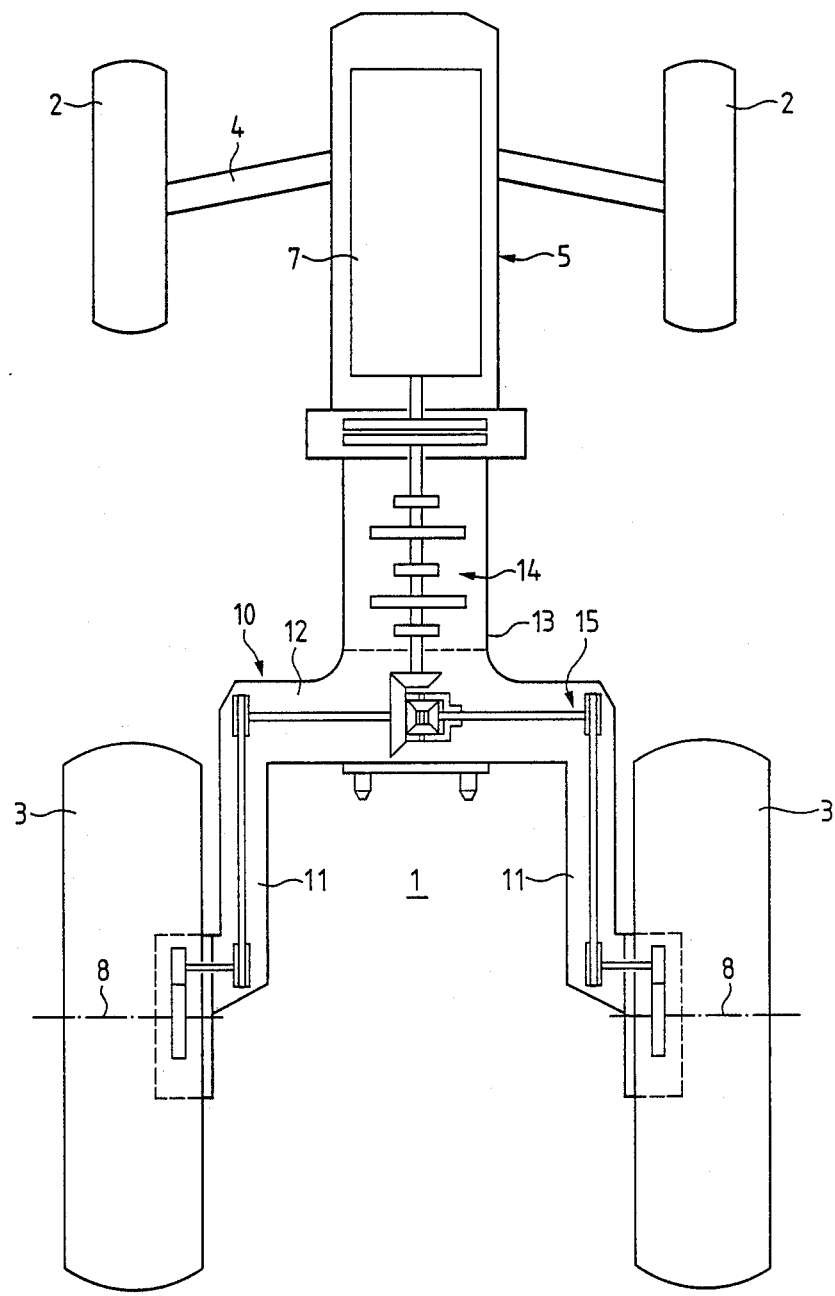
FIG. 2 is a top plan view of a tractor with a U-shaped rear wheel mounting in accordance with the invention.

FIG. 2 diagrammatically shows from above a tractor according to the invention. As with conventional tractors, there is a frame supporting an engine assembly 5 with an engine 7. A gear block (i.e., a gear shift or transmission mechanism) 14 is diagrammatically indicated. The vehicle can either have a rear wheel or an all-wheel drive. Contrary to the conventional procedure, the two rear wheels 3 are not mounted on a rigid, common drive axle, but on two lateral legs or longitudinal struts 11 of a rear wheel mounting or fixture 10. A conventional axle arrangement consequently does not exist and, instead, the mounting fulfills the functions of a chassis and an axle. This wheel mounting 10 preferably contains a transverse strut construction 12 and two lateral longitudinal struts 11 and, in general, has a substantially U-shaped configuration as seen from above. The transverse strut construction 12 is rigidly connected to the rear end 13 of the vehicle chassis.

Both the transverse strut construction 12 and the longitudinal struts 11 are internally hollow and constructed as torsion-resistant, load-carrying casings. The two rear wheels are mounted on the free rear ends of the longitudinal struts 22 and are driven by means of a power transmission drive 15 provided in the interior of the wheel mounting 10. The internal volume of the transverse strut structure 12 offers sufficient space for a transverse gear train 14 (spur bevel gear and differential). The width (i.e., lateral length) of the transverse strut construction 12 determines the spacing of the rear wheels 2. As a result of the lateral, spaced, rearwardly directed longitudinal struts 11, there is a free space 1 between the rear wheels, which space is approximately rectangular in plan view in the embodiment shown. The U-shaped wheel mounting 10 is preferably horizontal, i.e., approximately parallel to a horizontal plane. The two longitudinal struts or legs 11 are sufficiently long that their attachment point to the vehicle chassis or to the transverse strut construction 12 is in front of or in the vicinity of the leading edges of rear wheels 3.

The free space 1 between the rear wheels can be determined by a suitable choice of the length of the legs 11 and by their lateral spacing. There are practical limits because of the loads occurring when travelling and the necessary material thickness of the wheel mounting 10. The wheel base is roughly the same as in conventional tractors even though the rearwardly projecting longitudinal struts or legs 11 are provided. This is possible because hitherto the clutch case was lengthened and further components were made too large in order to obtain the necessary overall tractor length. However, as a compact construction is aimed at in the case of the inventive tractor, there is no need for a large clutch case and consequently the standard wheel base is obtained. The free space 1 between the rear wheels permits the attachment of tools or other means, as well as the coupling of additional implements or trailers. This construction permits displacement of the center of gravity of the thus provided tools or weights in the direction of travel and consequently leads to a more uniform weight distribution on the front and rear axles of the vehicle.

Figure 3:
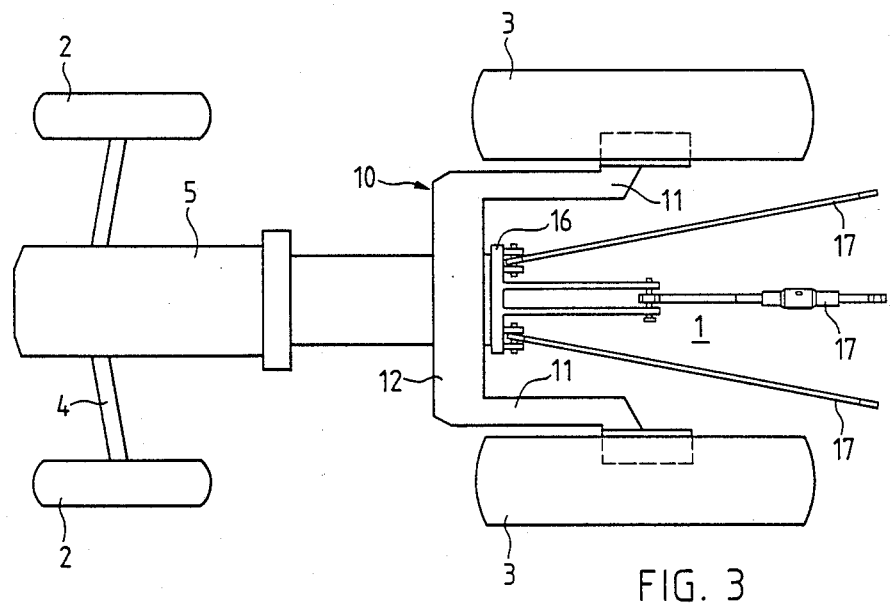
FIG. 3 is a top plan view of a tractor with a U-shaped rear wheel mounting in accordance with the invention and a three-point suspension.

FIG. 3 shows an embodiment of a tractor similar to that of FIG. 2 with a three-point suspension for the fitting of, e.g., agricultural tools. Three hinged brackets 17 are fixed in articulated manner to a support profile 16. A comparison with FIG. 1, which shows a conventional tractor with three-point suspension, reveals that with identical wheel axle positioning of the tools (not shown) fixed to the free ends of the hinged brackets 17, longer hinged brackets are used in the case of the inventive tractor. This has the advantage that much greater freedom of movement is obtained, i.e., the possibility of both the lateral swinging out and the vertical movement are increased. This makes it possible to raise long tools or tool combinations by means of a hydraulic lifting means (not shown) which was hitherto not possible due to inadequate freedom of movement. The use of long hinged brackets with conventional tractors would have led to the tools being positioned well behind the vehicle, so that the maneuverability and travelling stability would have suffered.

Figure 4:
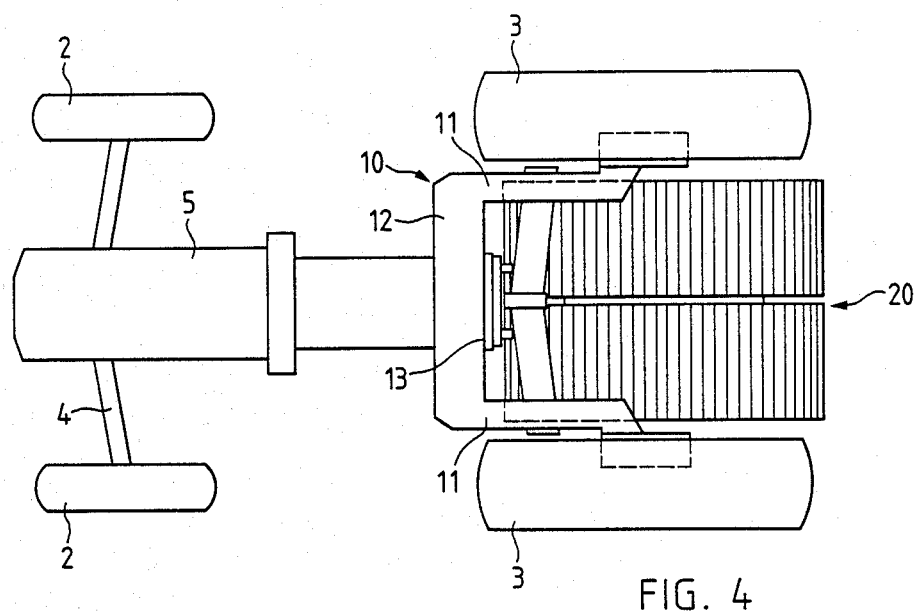
FIG. 4 is a top plan view of a tractor in accordance with the invention with a U-shaped rear wheel mounting and an additional driving caterpillar.

FIG. 4 shows an embodiment of a tractor with a novel auxiliary drive for use when hauling greater loads. A driving caterpillar 20 is coupled to the rear end 13 of the vehicle chassis and is essentially located between the two rear wheels 3. Use can be made of a thrust unit in accordance with European Patent Application 85107772.7 with the drive also described therein. This caterpillar or thrust unit 20 is so positioned in the longitudinal direction of the vehicle that its central axis substantially coincides with the rear wheel axle line. This ensures that the controllability of the vehicle is not impaired, because when steering and turning the vehicle both the rear wheels and also the driving caterpillar 20 are essentially located on a common line at right angles to the direction of travel. Through the use of such a caterpillar 20 the relatively lightweight tractor can be converted in a very short time to a powerful tractor with a very high pulling capacity. This leads to considerable advantages particularly in agriculture which requires tractors to carry out any different tasks and wherein hitherto two tractors have usually been needed to cover all these tasks. As a result of the additional bearing surface of the driving caterpillar 20 the maximum soil pressure loading the rear wheels can be reduced and simultaneously the pulling capacity increased, which is particularly advantageous in the case of ploughs, harrows or when carrying out heavy harvesting work. For difficult tasks, such as seedbed preparation, compression of the soil can be avoided through the use of the caterpillar. As the caterpillar can be constructed with a total height of only roughly 50 cm, it is possible to additionally use tools such as three-point suspensions, trailer couplings, rear loading shovels, etc.

Figure 5:
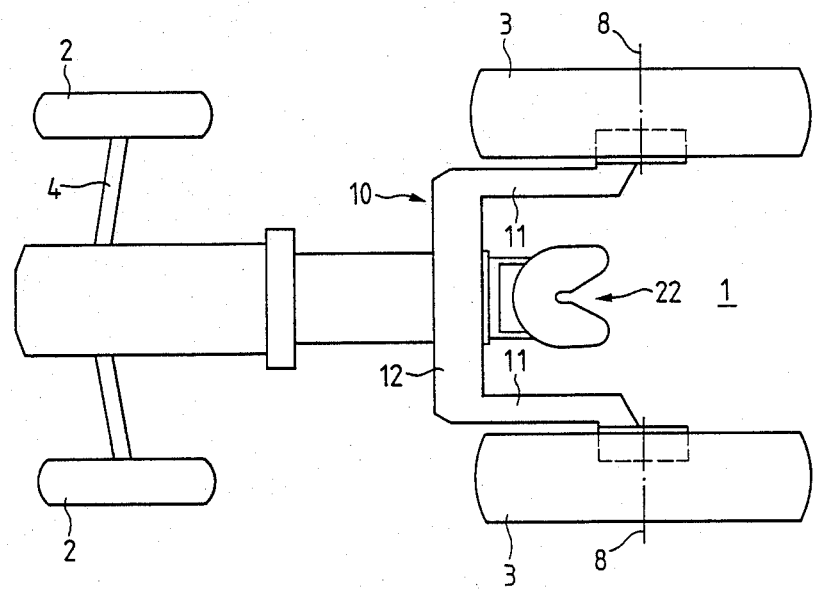
FIG. 5 is a top plan view of a tractor in accordance with the invention with a U-shaped rear wheel mounting and a saddle coupling in front of the rear wheel axle line.

FIG. 5 shows a tractor in accordance with the invention with a saddle coupling 22. The advantage of the inventive rear wheel fixture or mounting is that heavy two-wheel trailers, such as loaders which have hitherto not been located behind the rear wheel axle of the tractor are rather positioned above the same or, as shown in FIG. 5, are coupled and supported in front of the driving axle line 8. This enables the pulling tractor to take a much higher saddle load without the risk of lifting weight from the front axle 4 and thereby making the tractor uncontrollable. It is also possible to relieve the trailer axle because there is a load transfer to the tractor. This improved axle load distribution increases the travelling safety due to improved travelling characteristics and braking power of the tractor when travelling rapidly, particularly on roads.

Figure 6A:
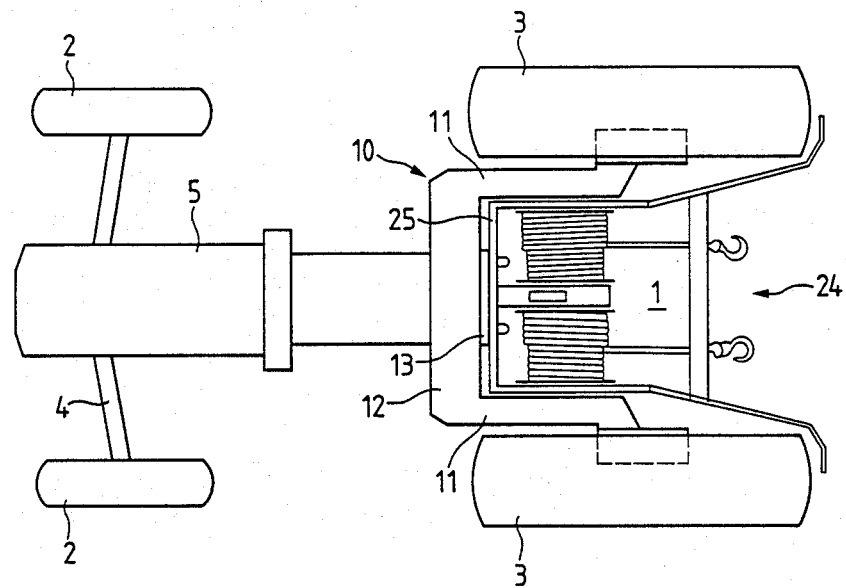
FIG. 6 is a top plan view of a tractor in accordance with the invention with a U-shaped rear wheel mounting and a double cable winch suspended between the rear wheels.
FIG. 6b is a top plan view of a tractor in accordance with the invention with a U-shaped rear wheel mounting and a fertilizer distributor fitted between the rear wheels.
FIG. 6c is a top plan view of a tractor in accordance with the invention with a U-shaped rear wheel mounting and a field sprayer suspended between the rear wheels.
Figure 6B:
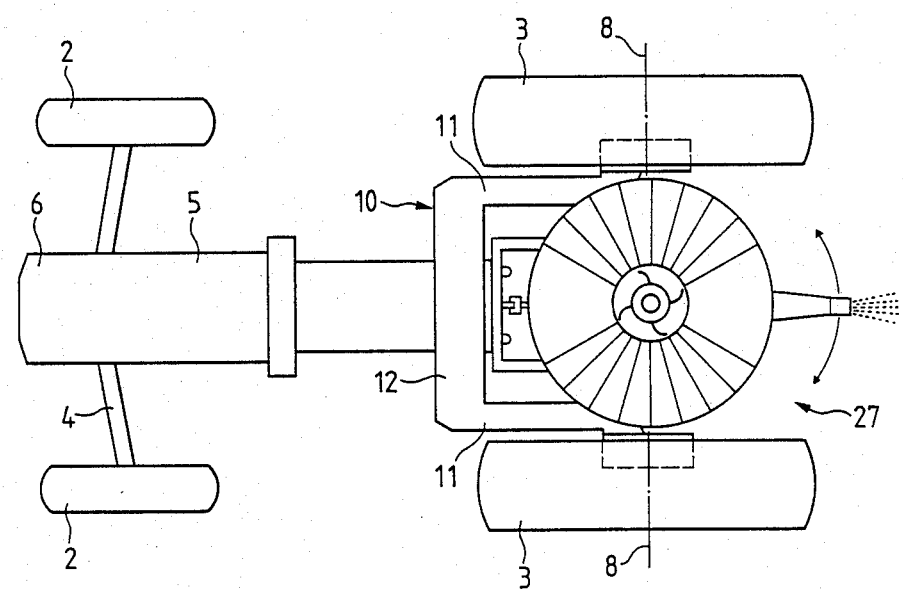
Figure 6C:
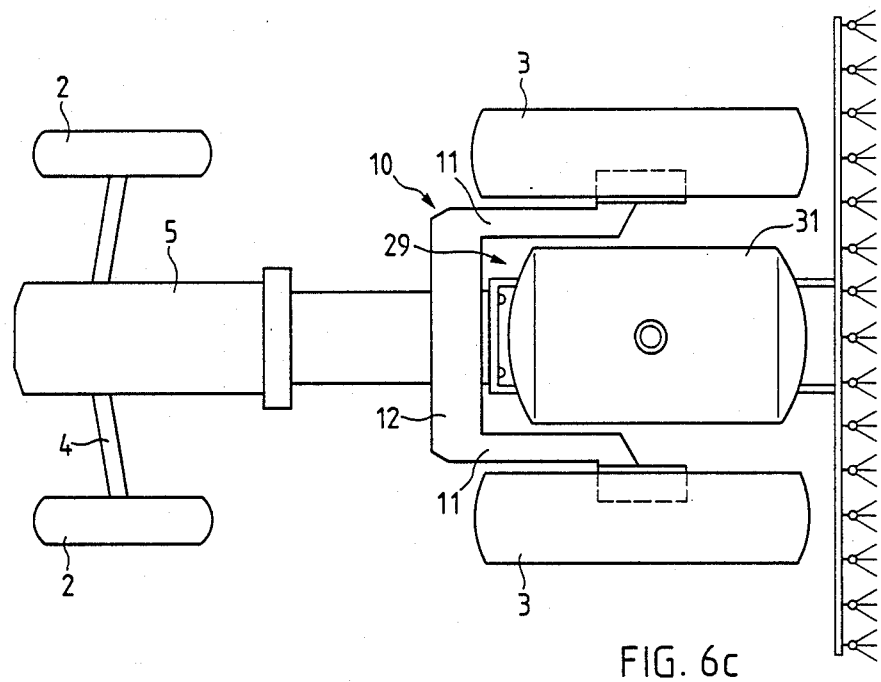

FIGS. 6a, 6b and 6c show an inventive vehicle with attached tools. It can be seen that the free space between the rear wheels 3 can be used for the often voluminous and heavy tools. A double cable winch 24, such as is used in forestry, is fixed by means of a suspension mechanism 25 to the rear tractor end 13. The center of gravity of the often heavy winches is located in front of the imaginary rear wheel axis and leads to uniform weight distribution on the front and rear wheels. This simultaneously leads to improved transfer of the pulling load to the prime mover, so that, in use, much higher torque than hitherto can be transferred via the wheels which is particularly important in the case of heavy pulling loads or when travelling uphill.

Another possible use is shown in FIG. 6b, where a fertilizer spreader or distributor 27 is positioned between the two rear wheels 3. Distributor 27, which often weighs over 500 kg when loaded, no longer has to be fitted, as hitherto, well behind the wheel axle. This also obviates the additional weights 19 (FIG. 1), which normally had to be fitted to the front 6 of the tractor, because there is no leverage with respect to the rear wheel axle due to the forwardly displaced position of the distributor center of gravity when travelling. The weight of the fertilizer distributor acts directly on or upstream of the axle of the rear wheels, which simultaneously leads to good travelling characteristics.

In a similar manner it is possible to fit a field sprayer or sprinkler 29 to the tractor, as shown in FIG. 6c. The spraying liquid container 31 with a capacity of a few hundred to over one thousand liters is favorably positioned between the rear wheels 3. Apart from the soil pressure reduction caused by the improved weight distribution, it is also possible to reduce the overall length of the tractor with the field sprayer attached, as compared with conventional vehicle-tool combinations, so that improved maneuverability is achieved. Compared with the hitherto used vehicles with loading bridges or similar structures for fitting implements over the rear wheel axle for improving the load distribution, the inventive construction leads to a much smaller overall height, in that the space between the large rear wheels is ideally utilized.

Figure 7:
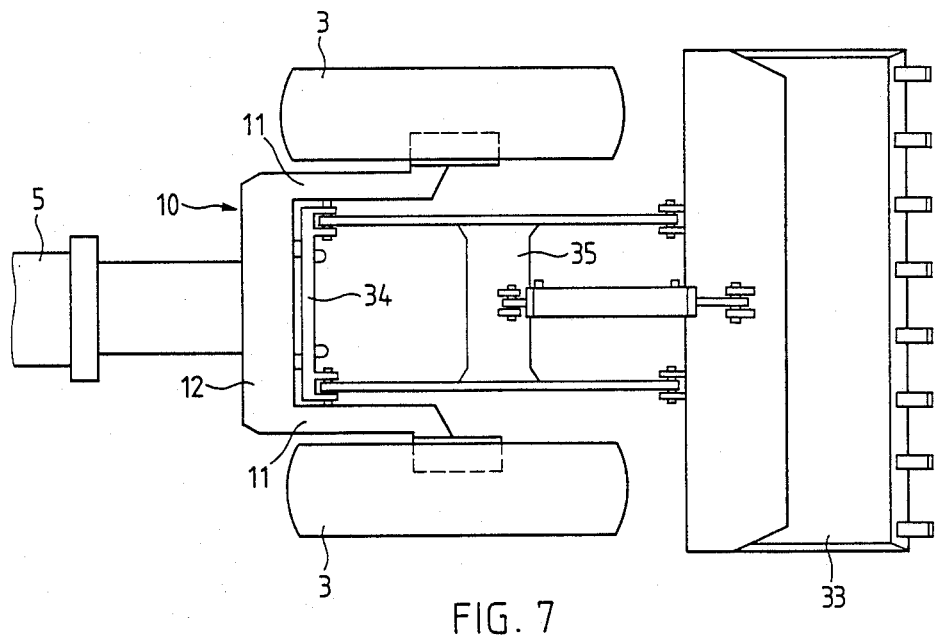
FIG. 7 is a top plan view of a tractor in accordance with the invention with a U-shaped rear wheel mounting and a rear loading shovel.

FIG. 7 shows an inventive tractor with a fitted rear-loading shovel or bucket 33. Such a loading shovel installation behind the tractor has not hitherto been possible due to the axle block 9 (FIG. 1). The disadvantageous, conventional front loader can now be replaced by a better and more efficient construction. By means of a fitting device 34 a hydraulically movable suspension means 35 can be fixed to the rear of the tractor chassis. For increasing traction and reducing soil or ground pressure, it is possible to use a driving caterpillar 20 (FIG. 4) simultaneously with the loading shovel. This makes it possible to carry out excavation work in much the same way as with construction machines. Such work was not possible with conventional front loaders due to the loads caused by the weight distribution. Compared with front loaders, it is possible to use much larger shovels or buckets and therefore the loading or cubic meter capacity can be significantly increased.

The free space between the rear wheels permits the coupling of further auxiliary means or tools, as well as trailers or other machines. It is also possible to mount any other bulky loads, tools or loading platforms between the rear wheels. The fitting devices, couplings or other auxiliary means can be provided directly on the vehicle chassis or on the wheel mounting 10.

Obviously wheel mounting 10 need not have a U-shape. Thus, in particular the transverse strut construction can be omitted and there can be two legs 11 emanating from one point. For special uses the transverse strut construction 12 can be made wider and more stable, so that the rearwardly projecting longitudinal struts 11 are located on the outside of the rear wheels and their wheel axles 11 are mounted in the strut 11 and directed inwardly. This makes it possible to also fix or support tools or auxiliary means on the outside of the rear wheels on the struts 11. The free ends of the longitudinal struts 11 can also be forked, the rear wheels in each case being located between the arms of the forks.

In order to achieve balanced loading of the longitudinal struts or legs 11 the wheel mounting 10 can also be inclined with respect to the horizontal position and can slope rearwardly. With a corresponding chassis design, the transverse strut construction can be eliminated or integrated into the chassis and the longitudinal struts can be directly mounted on the latter.

Figure 8:
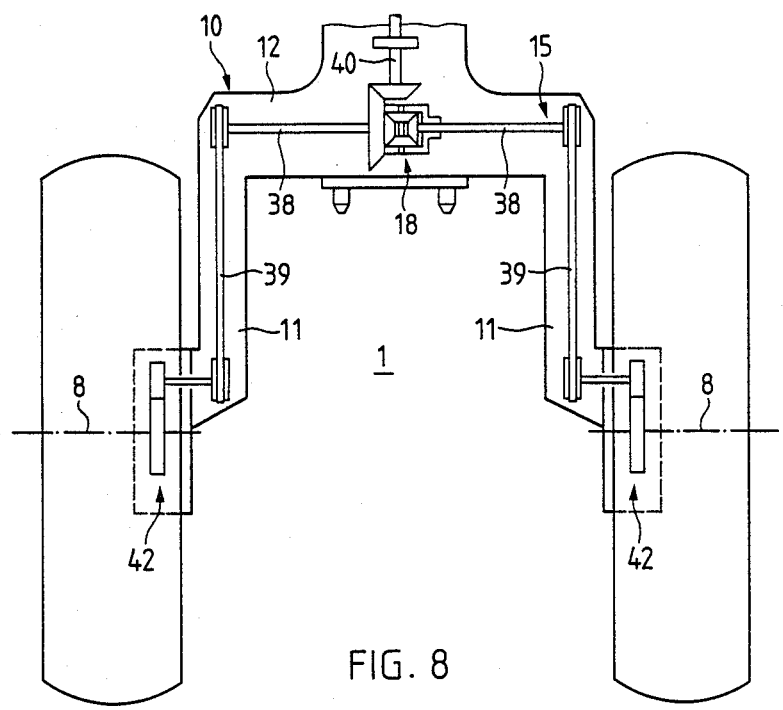
FIG. 8 is a rear elevation of a tractor in accordance with the invention having a rear wheel mounting with an integrated drive partly in cross-section.

A possible drive 15 for the rear wheels 3 is diagrammatically shown in FIG. 8. In the interior of the transverse strut construction 12 is located a transverse gear (spur bevel gear and differential) 18, which is connected by means of a driving shaft 40 and a gear shift mechanism 14 to motor 7 (cf. FIG. 1). By means of shafts 38 and further drive elements 39, preferably a chain drive, the two rear wheels 3 are driven. A reduction gear means 42 is provided on each of the ends of the longitudinal struts 11. This reduction gear means is preferably arranged in such a way that it projects into the free area of rear wheels 3.

Figures 9A, 9B:
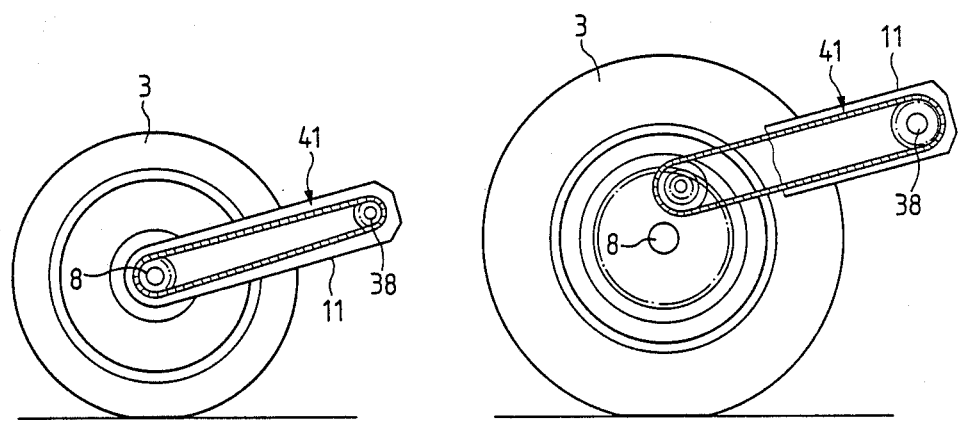
FIG. 9a is a partial side elevation, partly cut away of a rear wheel drive with a chain and a planetary reduction gear means integrated into the wheel.
FIG. 9b is a partial side elevation, partly cut away of a rear wheel drive with a chain and a reduction gear arrangement including an internal pinion.

FIGS. 9a and 9b show two possible variants of the chain drives 41. As the longitudinal struts 11 are exposed to considerable loads, particularly when travelling over uneven ground and consequently torsion and twisting can occur, it is advantageous to use chain drives. This makes it possible to avoid or compensate for mechanical loading when forces are transferred from shafts 38 to the rear wheel axles 8. In addition, such chain drives have relatively limited force or power losses of approximately 1%. It is possible to use chains with internal pinions (FIG. 9b) or a planetary gear (FIG. 9a).

With adequate strength of the casing wall of the longitudinal struts 11, it is also possible to use a gear drive 42 for driving the rear wheels 3, as shown in FIG. 10. The force is transferred from shafts 38 to rear wheel axles 8 by means of a plurality of spur gears 45.

Figure 11:
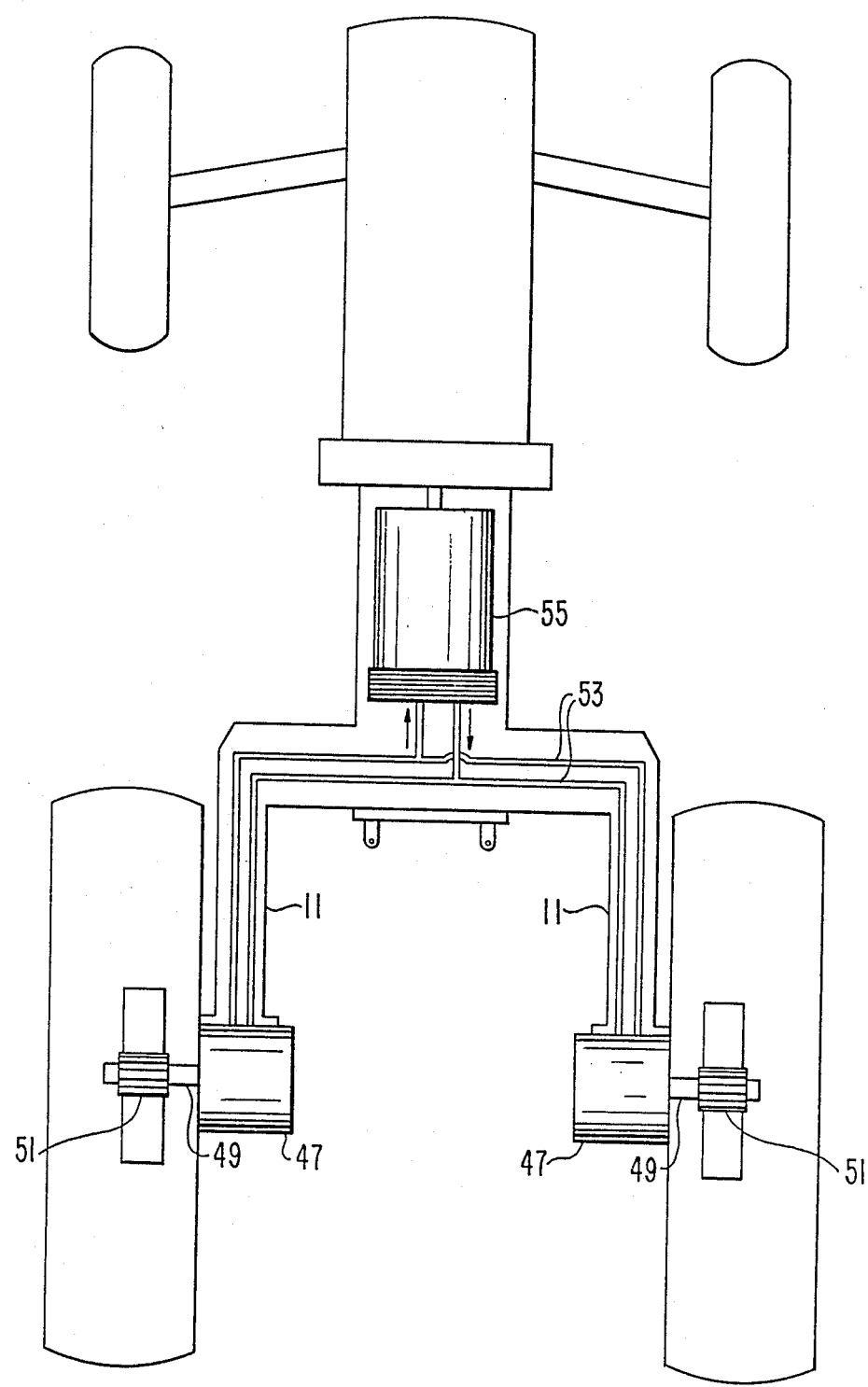
FIG. 11 is a top plan view schematically showing a basic hydraulic drive for a tractor in accordance with the invention.

Another variant of the invention shown in FIG. 11 makes use of a hydraulic device for the rear wheels 3 or, in the case of a four-wheel drive, also for the front wheels. A rear wheel drive includes hydraulic motors 47 mounted at the rear ends of longitudinally extending wheel mountings 11. Axles 49 connect the motors 47 to pinions 51 which drive wheels 3 in a manner similar to that shown in FIG. 8. The necessary connecting lines 53 extend between a controllable hydraulic pressure source 55 and motors 47 and are located in the interior of the rear wheel mounting 10 or pass along the same.

Preferably both the gear case and the rear wheel mounting 10 and drive 15 have lightweight construction, so that the overall weight of the vehicle is low. As the weight distribution does not, as hitherto, occur on the rear wheels as result of the inventive rear wheel mounting 10, a low vehicle weight does not impair the pulling capacity. The aforementioned possibility of an additional thrust unit is possible for large pulling capacities.

What is claimed is:

1. A pulling or loading vehicle, particularly a tractor, comprising
   two front and two rear wheels;
   drive means for driving at least said rear wheels;
   a substantially rigid vehicle frame supporting the front wheels of said vehicle and said drive means, said frame having a front end and a rear end; and
   wheel mounting means rigidly attached to said vehicle frame for rotatably supporting said rear wheels of said vehicle, said wheel mounting means comprising longitudinally extending struts spaced outwardly from said rear end and laterally spaced from each other, thereby defining an open space between said rear wheels in which auxiliary equipment for said vehicle can be mounted.

2. A vehicle according to claim 1 wherein said wheel mounting means comprises
   a transverse strut portion attached to said rear end of said frame and having lateral ends, said longitudinally extending struts being attached to said lateral ends and extending rearwardly from said attachment with said transverse strut portion substantially parallel with the direction of travel of said tractor.

3. A vehicle according to claim 2 wherein said rear wheels are mounted outwardly of said longitudinally extending struts.

4. A vehicle according to claim 2 wherein the lengths of said longitudinally extending struts is sufficiently great so that the forward limits of said rear wheels are located laterally of the attachment of said transverse strut portion to said longitudinally extending struts.

5. A vehicle according to claim 2 wherein said rear wheels are rotatably mounted to said longitudinally extending struts along a coaxial line lying in a plane containing said frame.

6. A vehicle according to claim 2 wherein said transverse strut portion and said longitudinal struts have means defining space for receiving power transmission means for transmitting power from said drive means to said rear wheels.

7. A vehicle according to claim 6 wherein said transverse strut portion is sufficiently large to receive therein a drive gear as part of said transmission means.

8. A vehicle according to claim 6 wherein said power transmission means includes first and second chain drives housed within said longitudinally extending struts.

9. A vehicle according to claim 6 wherein said power transmission means includes hydraulic motors and reduction gears housed within said longitudinally extending struts.

10. A vehicle according to claim 2 and further comprising a thrust unit mounted between said rear wheels for selectively providing additional drive thrust for said vehicle, said thrust unit being positioned so that its central axis perpendicular to the direction of motion is substantially aligned with the axis of rotation of said rear wheels.

11. A vehicle according to claim 2 wherein said transverse strut portion is formed as part of said frame.

12. A vehicle according to claim 2 wherein said vehicle frame includes means for attaching said auxiliary equipment thereto.

13. A vehicle according to claim 2 wherein said transverse strut portion includes means for attaching said auxiliary equipment thereto.

* * * * *